(12) United States Patent
Schaller et al.

(10) Patent No.: US 12,555,674 B2
(45) Date of Patent: Feb. 17, 2026

(54) METHOD FOR PROVIDING AN EDITED MEDICAL IMAGE OBTAINED BY APPLYING A TOOL SELECTED BASED ON AN ANATOMICAL REGION

(71) Applicant: Siemens Healthcare GmbH, Erlangen (DE)

(72) Inventors: Volker Schaller, Uttenreuth (DE); Bjorn Nolte, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 279 days.

(21) Appl. No.: 18/314,334

(22) Filed: May 9, 2023

(65) Prior Publication Data
US 2023/0368898 A1 Nov. 16, 2023

(30) Foreign Application Priority Data

May 11, 2022 (EP) .................................... 22172818

(51) Int. Cl.
*G16H 30/40* (2018.01)
*G06T 7/00* (2017.01)

(52) U.S. Cl.
CPC ........... *G16H 30/40* (2018.01); *G06T 7/0012* (2013.01)

(58) Field of Classification Search
CPC ....... G16H 30/40; G16H 50/20; G06T 7/0012
See application file for complete search history.

(56) References Cited

U.S. PATENT DOCUMENTS

| | | | |
|---|---|---|---|
| 2017/0245940 A1* | 8/2017 | Piron | G16H 30/20 |
| 2022/0092774 A1* | 3/2022 | Kohle | G06N 3/045 |
| 2022/0101960 A1* | 3/2022 | Kohle | G16H 10/40 |

FOREIGN PATENT DOCUMENTS

DE 102020211843 A1 3/2022

OTHER PUBLICATIONS

Supplement 23: Structured Reporting SOP classes p. 1 DICOM Standards Committee Digital Imaging and Communications in Medicine (DICOM) Supplement 23: Structured Reporting STorage SOP Classes Final Text Apr. 6, 2000; 2000.
"DICOM Standard" https://www.dicomstandard.org [retrieved on Apr. 26, 2023].
"FHIR standard—Fast Healthcare Interoperability Resources", https://www.fhir.org/ [retrieved on Apr. 26, 2023].

* cited by examiner

*Primary Examiner* — Kent Yip
(74) *Attorney, Agent, or Firm* — Harness, Dickey & Pierce, P.L.C.

(57) ABSTRACT

A computer-implemented method for providing an edited medical image, comprises: receiving a medical image depicting an examination region of a patient; receiving patient information for the patient; determining an anatomical region based on the medical image and the patient information, wherein the examination region includes the anatomical region; selecting a tool based on the anatomical region, wherein the tool is configured to edit the medical image; applying the selected tool to the medical image to obtain the edited medical image; and providing the edited medical image.

20 Claims, 4 Drawing Sheets

METHOD FOR PROVIDING AN EDITED MEDICAL IMAGE OBTAINED BY APPLYING A TOOL SELECTED BASED ON AN ANATOMICAL REGION

CROSS-REFERENCE TO RELATED APPLICATION(S)

The present application claims priority under 35 U.S.C. § 119 to European Patent Application No. 22172818.1, filed May 11, 2022, the entire contents of which are incorporated herein by reference.

FIELD

One or more example embodiments of the present invention relate to a computer-implemented method for providing an edited medical image. One or more example embodiments of the present invention also relate to a system that is designed to perform the method.

BACKGROUND

It is known to create and evaluate a medical image of a patient in order to make a medical diagnosis, or in the course of a medical treatment or intervention. For example, the medical image may be a two-dimensional X-ray image, an ultrasound image, a computed tomography (acronym: CT) image, a magnetic resonance tomography (acronym: MRT) image, a positron emission tomography (acronym: PET) image, or a single photon emission computed tomography (acronym: SPECT) image. Such a medical image is typically evaluated by a radiologist. The evaluation of the medical image comprises in particular making a diagnosis and/or diagnostic assessment and/or making a treatment plan etc. Evaluating the medical image is typically very time-consuming, in particular if three-dimensional image data such as a CT image or an MRI image or a PET image or a SPECT image is meant to be evaluated. When evaluating the medical image, a radiologist must typically take into account a large amount of patient information in addition to the medical image. The patient information relates to the patient who is depicted in the medical image. The patient information can be provided in the form of a patient file, for example, in particular an electronic patient file. The patient information can comprise, for example, an existing medical finding and/or an assumption about a medical finding and/or a further medical image, etc.

In some cases it is also necessary to have to consult an experienced and/or specialist second radiologist for the evaluation of the medical image.

Evaluating the medical image is therefore typically a time-consuming and costly process.

SUMMARY

An object of one or more example embodiments of the present invention is to provide a method that assists a radiologist in the evaluation of a medical image.

At least this object is achieved by a method for providing an edited medical image, by a system for providing a medical image, by a computer program product, and by a computer-readable storage medium as claimed in the independent claims and/or according to one or more example embodiments of the present invention. The dependent claims and the following description contain advantageous developments.

An example manner in which embodiments of the present invention achieve the object is described below both with reference to the claimed devices and with reference to the claimed method. Features, advantages or alternative embodiments mentioned in this connection can also be applied equally to the other claimed subject matter, and vice versa. In other words, the object-based claims (which are directed at a device, for example) can also be developed by combining with features described or claimed in connection with a method. The corresponding functional features of the method are embodied by corresponding object-related modules in this case.

One or more example embodiments of the present invention relate to a computer-implemented method for providing an edited medical image. The method comprises a method step of receiving a medical image, wherein the medical image depicts an examination region of a patient. The method also comprises a method step of receiving patient information of the patient. The method also comprises a method step of determining an anatomical region on the basis of the medical image and the patient information. The examination region comprises said anatomical region. The method also comprises a method step of selecting a tool on the basis of the anatomical region. Said tool is designed to edit the medical image. The method also comprises a method step of applying the selected tool to the medical image, wherein the edited medical image is determined. The method also comprises a method step of providing the edited medical image.

The medical image is received by an interface. In other words, the interface is designed to receive the medical image. The medical image may be a three-dimensional or a two-dimensional medical image of the examination region of the patient. For example, the medical image may be a two-dimensional X-ray image, an ultrasound image, a computed tomography (acronym: CT) image, a magnetic resonance tomography (acronym: MRT) image, a positron emission tomography (acronym: PET) image, or a single photon emission computed tomography (acronym: SPECT) image.

In particular, the patient is a human. Alternatively, the patient may be an animal or an object.

The examination region comprises at least a portion of the patient.

The interface is also designed to receive the patient information. Said patient information is information relating to the patient. The patient information can comprise generally valid information, for example physical features, about the patient, and/or information from a prior examination of the patient and/or information from an examination carried out in parallel and/or information from a case history of the patient, etc. In addition, in embodiments of the present invention, the patient information can comprise information about why the medical image was captured or acquired. In other words, the patient information can comprise a diagnostic task.

In the method step of determining the anatomical region, the anatomical region is determined on the basis of the medical image and the patient information. The anatomical region is determined by a computing unit. In other words, the computing unit is designed to determine the anatomical region. The examination region depicted in the medical image comprises the anatomical region. The anatomical region is the region of the patient that is relevant to the evaluation of the medical image. In particular, the anatomical region can be a region of the patient that is relevant to a diagnosis or diagnostic assessment and/or to a treatment of the patient. The anatomical region may be, for example, a lesion or an accumulation of lesions or a region comprising one or more lesions. Alternatively, the anatomical region can relate to an organ structure, or to a body part that comprises an abnormal region or an abnormal structure. For example, the anatomical region can be the left upper lobe of the lung or the right femur or a mitral valve, etc.

In the method step of selecting the tool, a tool for editing the medical image is selected on the basis of the anatomical region. In particular, the computing unit is designed to select the tool. The tool can be in particular an algorithm or an image editing algorithm that can be applied to the medical image. In particular, the tool can comprise a trained function that can be applied to the medical image.

The tool is designed in particular for the anatomical region. In other words, the tool is designed to be applied to a medical image that depicts the anatomical region. In other words, the tool is designed to edit the anatomical region depicted in the medical image.

In the method step of applying the selected tool, the tool is applied by the computing unit to the medical image. In other words, the computing unit is designed to apply the tool to the medical image. The medical image is edited when the tool is applied to the medical image. In other words, the edited medical image is determined by applying the tool to the medical image. The editing of the medical image can relate in particular to the anatomical region.

The edited medical image can comprise, for example, labeling or highlighting of a lesion or of a region of interest (Acronym: ROI) in the medical image. Said lesion or said ROI has been detected by the tool. For example, the lesion or ROI can be segmented by applying the tool.

Alternatively or additionally, the edited image can be an annotated image. For example, in the annotated image a measurement value determined by applying the tool can be entered. The measurement value can be, for example, a diameter of a lesion etc.

Alternatively or additionally, the edited medical image can comprise at least one slice image that depicts a lesion or another abnormal structure of the examination region depicted in the medical image. The edited medical image can comprise a slice image in particular when the medical image is a three-dimensional medical image, in particular a CT image or an MRT image or a PET image or a SPECT image. In other words, the tool can be designed to select a relevant slice image from the corresponding three-dimensional medical image that is particularly suitable for evaluating the medical image.

In the method step of providing the edited medical image, the medical image is provided via the interface. In particular, the edited medical image can be provided to a database for storing the edited medical image. Alternatively or additionally, the edited medical image is provided to a display unit, which is designed to display the edited medical image. The display unit may be a screen or a monitor.

The inventors have discovered that, on the basis of the information available, in particular on the basis of the medical image and the patient information, an anatomical region in the medical image can be determined that is particularly relevant to evaluating the medical image. The inventors have discovered that, on the basis of the anatomical region, a suitable tool can be selected for editing the medical image, and the medical image can be edited using this tool. The inventors have discovered that editing the medical image using the tool can reduce the workload of a radiologist in the evaluation of the medical image. In particular, the radiologist can then evaluate the edited medical image. Thus the radiologist can be presented with the information from the medical image and from the patient information in a compact manner, whereby not only can the radiologist save time but costs can also be saved.

According to an aspect of an embodiment of the present invention, the patient information comprises entries from a patient file of the patient and/or comprises at least one further medical image of the patient, which differs from the medical image, and/or comprises a diagnostic task associated with the medical image.

In particular, the patient file can be an electronic patient file. The patient can be held or saved or stored in particular in a Hospital Information System (acronym: HIS). In particular, the patient file can comprise general information about the patient. The general information can comprise, for example, the age and/or gender of the patient. Alternatively or additionally, the patient file can comprise information about an existing diagnosis or diagnostic assessment of the patient. The patient file can comprise or depict in particular a medical history of the patient. Alternatively or additionally, the patient file can comprise a diagnostic report about the patient. In particular, the patient file can comprise at least one further medical image of the patient, which differs from the medical image. Alternatively or additionally, the patient file may be linked to the further medical image. In particular, the further medical image can be held in a Picture Archive and Communication System (acronym: PACS). The further medical image can have been captured before, at the same time as, or after the medical image.

The diagnostic task specifies why the medical image was captured. In other words, the diagnostic task specifies a purpose for which the medical image was captured. In particular, the diagnostic task can specify what suspected diagnosis is meant to be confirmed or rejected by the medical image. Alternatively or additionally, the diagnostic task can specify how the medical image is meant to be captured. The diagnostic task can likewise be part of the patient file.

The inventors have discovered that the determining of the edited medical image can take into account a large amount of different information about the patient. The inventors have discovered that the anatomical region relevant to evaluating the medical image can be determined from the large amount of said information. In other words, on the basis of the large amount of information, the medical image can be edited such that evaluating the medical image can be made simpler and faster for the radiologist.

According to a further aspect of an embodiment of the present invention, the method comprises a method step of determining from the patient information those further medical images of the patient that depict the anatomical region. The method also comprises a method step of providing the determined further medical images.

In particular, the patient file can comprise, or be linked to, at least one further medical image of the patient.

The computing unit is designed to determine the further medical image(s) that depict the anatomical region. It can be the case here that no further medical images or one or more further medical images depicting the anatomical region are determined.

In particular, the further medical images comprised in the patient file or linked to the patient file can be analyzed for this purpose. In particular, a similarity between the medical image and the further medical images can be analyzed. Alternatively or additionally, meta-information for the further medical images can be analyzed. Said meta-information can be comprised in particular in a DICOM header of the further medical images.

The further medical image(s) that depict the anatomical region are provided by the interface in the method step of providing the determined further medical images. In other words, the interface is also designed to provide the further medical image(s). The further medical image(s) can be provided in particular to a display unit, which is designed to display the medical image(s). In particular, the display unit may be a screen or a monitor or a projector.

The inventors have discovered that the further medical image(s) that likewise depict the anatomical region of the medical image can assist the radiologist in the evaluation of the medical image. For example, the further medical image (s) can depict jointly with the medical image a time series of the anatomical region. In other words, the medical images can jointly depict a development over time of the anatomical region. The inventors have discovered that the development over time assists the radiologist in evaluating the current medical image and deducing from the medical image a suitable diagnosis or medical finding and/or treatment.

According to a further aspect of an embodiment of the present invention, the method comprises a method step of applying the selected tool to the determined further medical images that depict the anatomical region. The method comprises a further method step of providing the edited further medical images.

In the method step of applying the selected tool to the determined further medical images, the tool is applied to the one or more further medical images which were determined in the method step of determining those further medical images that depict the anatomical region. The tool is applied here in a similar way to how the tool is applied to the medical image.

In the method step of providing the edited further medical images, the further medical images edited by applying the tool are provided by the interface. In other words, the interface is designed to provide the edited further medical images. In particular here, at least one or more edited further medical images can be provided. The further edited medical image(s) can be provided by the interface to a display unit designed as described above. Said display unit is designed to display the edited further medical image(s). The edited further medical image(s) can be displayed and/or provided jointly with the edited medical image.

The inventors have discovered that the evaluation of the medical image can be made faster and simpler if the comparable further medical images are provided in a similar way to the medical image. The inventors have also discovered that for this purpose, the further medical images have advantageously been edited by the tool in a similar way to the medical image. The inventors have discovered that this ensures comparability between the images. The inventors have also discovered that the editing, or applying the tool to the further medical images and the medical image, can ensure that the radiologist can quickly identify and evaluate the relevant information from the medical image and the further medical images. For example, an annotation of the edited medical images in the form of a diameter of a lesion can make it easy to identify and analyze a change in the lesion between the further edited medical images and the edited medical image.

According to a further aspect of an embodiment of the present invention, the method step of determining the anatomical region comprises a method step of determining a set of observables based on the medical image and the patient information. Here, the determining of the anatomical region is based on a set of observables.

The computing unit is designed here to determine the set of observables.

The set of observables comprises at least one observable. An observable describes in particular an attribute of the medical image and/or of the patient and/or of a diagnostic assessment, etc.

In the method step of determining the set of observables, the information or attributes are thus extracted from the patient information and the medical image that are relevant to determining the anatomical region.

For example, the medical image can comprise a DICOM header (DICOM acronym for Digital Imaging and Communications in Medicine). The DICOM header comprises a plurality of DICOM entries. A DICOM entry typically comprises a DICOM tag and a DICOM value assigned to the DICOM tag. For example, the depicted examination region or anatomical region can be specified in the DICOM value for the DICOM tag 'body region'. When determining the set of observables, the DICOM entries that are relevant to determining the anatomical region can be determined as observables. Non-relevant DICOM entries are not included in the set of observables.

When determining the set of observables, relevant information for determining the anatomical region can also be extracted from the patient information. For example, an observable can be a keyword from the diagnostic task or from a diagnostic report, etc. For example, an observable can specify a pre-existing condition of the patient, which can be derived from the patient information.

The determining of the set of observables therefore describes an extraction of information or attributes that are relevant to determining the anatomical region from the medical image and from the patient information.

The inventors have discovered that by determining the set of observables, the information or attributes that have to be taken into account in determining the anatomical region can be reduced to the relevant information. The inventors have discovered that it is thereby possible to speed up the determination of the anatomical region. The inventors have also discovered that by determining the set of observables, the determination of the anatomical region is traceable. In other words, it can be traced from the set of observables, what information was taken into account in order to determine the anatomical region.

According to a further aspect of an embodiment of the present invention, an observable from the set of observables is a system-internal observable, or an entry in a set of attributes that is associated with the medical image, or a body part according to a medical finding according to the patient information, or an abnormal laboratory value according to the patient information, or a body region from which, according to the patient information, a tissue sample was taken, or a suspected diagnosis or medical finding according to the patient information, or a keyword from a diagnostic task for the medical image.

The system-internal observable is based on a predetermined, in particular standardized, anatomical ontology. In particular, one or more of the system-internal observables can be linked together hierarchically in accordance with the predetermined anatomical ontology. The predetermined anatomical ontology is based in particular on the "SNOMED Clinical Terms" terminology or ontology and/or the "RadLex" terminology or ontology. The use of these standardized terminologies, which are known per se, for defining or structuring the observables ensures compatibility with the clinical procedures, improves the exchange of information, and simplifies the assignment of the anatomical region.

The set of attributes that is associated with the medical image can be in particular a DICOM header in the form described above. In this case, each DICOM entry describes an attribute of the medical image, or of the examination region depicted in the medical image, or of the patient. Thus the observable can be at least one DICOM entry or a corresponding DICOM value.

In particular, the observable can be a body part of the patient that is mentioned in a medical finding in the patient information. For example, a medical finding in the patient information, in particular in the patient file, can relate to the patient's lungs. The observable can then be "lungs".

Alternatively, the observable can be an abnormal laboratory value according to the patient information, in particular according to the patient file. In particular, said laboratory value can describe specifically an attribute of an organ. For example, a raised bilirubin level can point to a liver malfunction. The observable can thus be "bilirubin". When determining the anatomical region, the liver can then be inferred from the observable.

Alternatively, the observable can specify a body part from which, according to the patient information, in particular the patient file, a tissue sample has been taken. Said tissue sample can be in particular a biopsy. A biopsy of the patient's breast tissue can suggest that an abnormality in the patient's breast is known. The observable can then be "breast", for instance.

Alternatively, the observable can be a suspected diagnosis. In particular, the observable can be based on the suspected diagnosis. In particular, the observable can be a keyword or a summary of the suspected diagnosis.

For example, the suspected diagnosis may be "lung carcinoma". Alternatively, the suspected diagnosis may be specified in the form of a standardized anatomical ontology. The observable can then be in particular a system-internal observable. In particular, the patient information can comprise the suspected diagnosis. The suspected diagnosis may have been made by a medical professional on the basis of further examinations of the patient.

Alternatively, the observable can be a medical finding according to the patient information, in particular the patient file. In particular, the observable can be a keyword of the medical finding. Alternatively, the observable can be a system-internal observable that describes the medical finding. The medical finding can be based in particular on further examinations of the patient. The medical finding can be known from the medical history of the patient.

Alternatively, the observable can be a keyword from the diagnostic task for the medical image. The diagnostic task specifies for what purpose the medical image was meant to be captured. In particular, the diagnostic task can specify how the medical image is meant to be captured. In particular, the diagnostic task can specify what examination region is meant to be captured in what way in the medical image. For example, the diagnostic task can read "thorax acquisition, right lung". The observable can then be "thorax" or "right lung".

The inventors have discovered that, via the observables, relevant information can be extracted from the medical image and the patient information. The inventors have discovered that the set of observables can take into account a large amount of different information.

According to a further aspect of an embodiment of the present invention, in the method step of determining the anatomical region, pattern recognition is used to determine the anatomical region from a plurality of anatomical regions. In this case, each of the anatomical regions of the plurality of anatomical regions is associated with a set of typical observables. Pattern recognition is used to determine from the plurality of anatomical regions, that anatomical region for which the associated set of typical observables best matches the set of observables determined on the basis of the medical image and the patient information.

Thus in particular a plurality of anatomical regions are provided, for each of which has been determined in advance a set of typical observables. The typical observables are embodied as described above with regard to the observables. The set of typical observables of an anatomical region comprises in particular those observables that arise typically, or particularly frequently, in connection with the anatomical region. In other words, the set of typical observables comprises those observables that are indicative of the anatomical region. An observable can be comprised by more than one set of typical observables. The combination of typical observables in a set of typical observables can be typical of, or unique to, the corresponding anatomical region.

Pattern recognition can be used to determine from the plurality of sets of typical observables that set that best corresponds to the determined set of observables. In other words, that set of typical observables is determined that has the greatest match with the set of observables determined for the medical image. The determined set of observables is the set of observables that was determined in the method step of determining the set of observables on the basis of the medical image and the patient information.

That anatomical region associated with the previously selected set of typical observables or described thereby is then determined from the plurality of anatomical regions as the anatomical region.

The pattern recognition can be based here in particular on a trained function. In this case, the trained function is applied to the determined set of observables. In this process is determined the anatomical region having the set of typical observables that best matches the determined set of observables.

In general, a trained function mimics cognitive functions that link humans to human thinking. In particular, via training based on training data, the trained function can adapt to new circumstances and also recognize and extrapolate patterns.

In general, parameters of a trained function can be adjusted by training. In particular, supervised training, semi-supervised training, unsupervised training, reinforcement learning and/or active learning can be used for this. Furthermore, representation learning (also known as feature learning), can be used. In particular, the parameters of the trained functions are adjusted iteratively by a plurality of training steps.

A trained function can comprise in particular a neural network, a support vector machine, a random tree or a decision tree, and/or a Bayes network, and/or the trained function can be based on k-means clustering, Q-learning, genetic algorithms, and/or association rules. In particular, a trained function can comprise a combination of a plurality of uncorrelated decision trees or an ensemble of decision trees (random forest). In particular, the trained function can be determined via XGBoosting (extreme Gradient Boosting). In particular, a neural network can be a deep neural network, a convolutional neural network, or a convolutional deep neural network. In addition, a neural network can be an adversarial network, a deep adversarial network, and/or a generative adversarial network. In particular, a neural network can be a recurrent neural network. In particular, a recurrent neural network can be a network with a long-shortterm-memory (LSTM), in particular a gated recurrent unit (GRU). In particular, a trained function can comprise a combination of the described approaches. In particular, the approaches described here for a trained function are called the network architecture of the trained function.

The inventors have discovered that the anatomical region can be determined by pattern recognition. For this purpose, sets of typical observables for different anatomical regions are compared with the determined set of observables, and the best-fitting set of typical observables, and thereby the associated anatomical region, is determined. The inventors have discovered that this is an efficient and simple method for determining the anatomical region.

According to a further aspect of an embodiment of the present invention, the patient information comprises at least one entry from a patient file and/or comprises a diagnostic task. The medical image is associated with a set of attributes. The method step of determining the set of observables here comprises a method step of applying a linguistic analysis function to the at least one entry from the patient file and/or to the diagnostic task. At least one keyword is determined in this process. The method step of determining the set of observables also comprises a method step of comparing the at least one keyword with the set of attributes. In the event of a positive comparison, the keyword is adopted in the set of observables.

The entry from the patient file can be, for example, a laboratory value or an entry relating to a tissue sample that has been taken, etc. In other words, an entry from the patient file can comprise information about a medical history of the patient. In particular, an entry from the patient file can comprise information about at least one previous diagnosis and/or examination and/or treatment and/or diagnostic assessment of the patient. Alternatively or additionally, the entry in the patient file can comprise general information about the patient. The general information about the patient can be, for example, information about the age or gender of the patient. In other words, the general information can comprise information about a physical feature of the patient.

The diagnostic task is embodied as described above. In particular, the diagnostic task specifies for what purpose the medical image was captured. The diagnostic task can also specify how the medical image was meant to be captured or from which examination region the medical image was meant to be captured.

The linguistic analysis function is designed to analyze the content of a text. In other words, the linguistic analysis function is designed to identify on the basis of linguistic information, in particular information containing natural language, and provide as separate information the diagnostic task and/or the at least one entry from the patient file. In particular, the linguistic analysis function can be designed to evaluate metadata of the at least one entry from the patient file, for instance a DICOM header.

The linguistic analysis function is applied to the at least one entry from the patient file and/or to the diagnostic task. In this process, the text of the at least one entry and/or of the diagnostic task is analyzed. At least one keyword is determined on the basis of the analysis. In particular, at least one keyword can be determined for each entry from the patient file and/or for the diagnostic task. In particular, at least one keyword can be determined in each case for associated or interdependent entries from the patient file.

Thus the keyword describes at least one entry from the patient file and/or describes the diagnostic task. In particular, the keyword can be a summary of the at least one entry and/or of the diagnostic task.

The computing unit is designed here to perform the method step of applying the linguistic analysis function.

The set of attributes is embodied as described above. In particular, the set of attributes can be a DICOM header.

In the method step of comparing the at least one keyword with the set of attributes, it is compared whether the set of attributes comprises the keyword. The computing unit is designed here to perform the method step of comparing.

In particular, the comparison can check whether the set of attributes comprises the keyword exactly or synonymously.

If the set of attributes is a DICOM header, it is compared in particular whether a DICOM value corresponds to the keyword exactly or synonymously.

For example, it may have been determined via the linguistic analysis that an entry from the patient file relates to the patient's lungs, and another entry from the patient file relates to a knee of the patient. In this case, in the method step of applying the linguistic analysis function, the two keywords "knee" and "lungs" are determined. The set of attributes comprises a DICOM value "thorax". The examination region depicted in the medical image thus comprises the patient's thorax. In the method step of comparing, a positive comparison is ascertained between "lungs" and "thorax", whereas the comparison between "knee" and "thorax" is negative. Thus the keyword "lungs" is adopted in the set of observables. In embodiments of the present invention, alternatively or additionally "thorax" can be adopted in the set of observables.

The inventors have discovered that, by the described comparison, it is possible to ensure that observables having nothing to do with the medical image are not extracted from the patient information and/or from the diagnostic task. In his medical history, the patient can also have already received various non-related examinations and diagnoses that are independent of the evaluation of the current medical image. In this case, the application of the linguistic analysis function and the comparison prevent observables that are independent of the medical image and irrelevant to the evaluation from being adopted in the set of observables.

According to a further aspect of an embodiment of the present invention, the method comprises a method step of providing the set of observables. The method also comprise a method step of receiving user input relating to the set of observables. The determining of the anatomical region takes into account said user input.

In the method step of providing the set of observables, the set of observables is provided to a user, in particular the radiologist, via the interface. In particular, the set of observables can be provided or displayed to the user by a display unit, in particular a monitor or a screen. The set of observables can be displayed to the user in the form of a list.

In the method step of receiving the user input, the user input is received via the interface. The user can provide the user input here via the interface. For example, the user input can be provided by an input via a touchscreen and/or a touchpad and/or a mouse click, etc.

In the user input, those observables that the user considers relevant to the medical image can be selected from the set of observables. Alternatively or additionally, the user input can comprise one or more observables that the set of observables does not yet comprise.

The set of observables can then be adjusted according to the user input. In particular, the set of observables can be restricted to the observables that are selected or deemed relevant. Alternatively or additionally, the one or more additional observables can be adopted in the set of observables. The anatomical region can then be determined on the basis of this adjusted set of observables. In other words, the determining of the anatomical region takes into account the user input.

In an embodiment of the present invention, the method step of determining the anatomical region can comprise the method steps of providing the set of observables and receiving the user input. In particular, the anatomical region can then be determined on the basis of the set of observables that has been adjusted by the user input.

Alternatively, the anatomical region can be determined initially on the basis of the set of observables determined in the method step of determining the set of observables. Then, in the method step of providing the set of observables, the determined anatomical region can additionally be provided. The user input can then take into account the determined anatomical region. In other words, the set of observables can then be adjusted on the basis of the user input taking into account the already determined anatomical region. Then the anatomical region can be redetermined on the basis of the adjusted set of observables.

The inventors have discovered that the determining of the anatomical region can take into account a user input by adjusting the set of observables according to the user input. The inventors have discovered that it is thereby possible to check and, if applicable, correct or adjust the set of observables. For example, information that is missing from the medical image and/or from the patient information and has not yet been taken into account in the set of observables but is known to the user can thereby be adopted in the set of observables. Inappropriate observables, which would possibly lead to an incorrect anatomical region, can be deleted from the set of observables.

According to a further aspect of an embodiment of the present invention, the user input relating to the set of observables comprises prioritizing and/or deleting and/or selecting the observables.

As described above, one or more observables can be deleted from the set of observables by the user input. In particular, the determining of the anatomical region no longer takes into account the deleted observables.

Alternatively or additionally, one or more observables deemed relevant to the medical image can be selected from the set of observables by the user input, as described above. In particular, the observables that are not selected from the set of observables can then be deleted or removed from the set of observables.

Alternatively or additionally, one or more observables which the set of observables does not yet comprise can be selected by the user input and added to the set of observables, as described above.

Alternatively or additionally, the observables comprised by the set of observables can be prioritized by the user input. In particular, a set of observables already adjusted by selection or deletion can be prioritized. In this case, the prioritization indicates which observables are particularly relevant to the medical image or to the evaluation of the medical image. In particular, the above-described pattern recognition for determining the anatomical region can take into account the prioritization. The higher the priority of an observable, the more important it is in the pattern recognition that the set of typical observables also comprises the observable concerned.

The inventors have discovered that different forms of the user input can be taken into account. The inventors have discovered that either the set of observables can be adjusted accordingly directly or can be taken into account accordingly by the prioritization in determining the anatomical region.

According to a further aspect of an embodiment of the present invention, the method comprises a method step of determining a search profile for similar patients on the basis of the patient information and/or the medical image. The method also comprises a method step of determining at least one similar patient from a plurality of reference patients by applying the search profile in a medical information system in which the various reference patients are filed. The method also comprises a method step of providing information relating to the at least one similar patient.

The method step of determining the search profile is implemented in particular by the computing unit.

A similar patient can be similar to the patient in particular in terms of his general or physical features or attributes. Alternatively or additionally, a similar patient can be similar to the patient in terms of his medical history, in particular in terms of his diagnoses, examinations, medical findings, etc. For example, the similar patient may suffer from the same disease as the patient. Alternatively or additionally, an identical or comparable medical image may have been captured from the similar patient and advantageously evaluated.

The search profile is determined or created on the basis of the patient information and/or the medical image.

The search profile describes a search for a patient who has attributes that are similar or identical to those of the patient, which attributes relate to his physical attributes or features and/or relate to his medical history. In other words, the search profile defines attributes that a patient must have in order to be similar to the patient.

In particular, for determining the search profile, initially a set of observables, embodied as described above, can be determined. In other words, the method step of determining the search profile can comprise a method step of determining a set of observables on the basis of the patient information and/or the medical image. The method step of determining the set of observables can be embodied as described above. Thus the search profile can be determined on the basis of the set of observables.

In embodiments of the present invention, the search profile can be determined by applying a trained function. Said trained function can be embodied as described above. In particular, the trained function can be adjusted or optimized on the basis of user feedback. The trained function can be trained, or learnt, via federated learning. For this purpose, a pre-trained function can be determined at each of different institutions on the basis of the reference patients present there. The trained function can then be determined on the basis of the various pre-trained functions without data or information about the reference patients having to leave the different institutions. In particular, an institution may be a hospital or a hospital group or a medical practice, etc.

In order to train the trained function, the trained function is applied to the reference patients filed in an institution. In other words, the trained function is applied to reference-patient-information and/or medical images held for the reference patients. The trained function is designed here to recognize similarities and to cluster the reference patients. The trained function can be adjusted or trained by the feedback from the user such that the clustering better matches the feedback.

Alternatively or additionally, the search profile can be determined on the basis of the anatomical region. In this case, the determining of the search profile takes into account which anatomical region has been determined. In other words, the search profile is then based on the anatomical region determined on the basis of the patient information and/or the medical image. In this case, the search profile can be designed such that the search profile can be used to search for a similar patient for whom an examination of the same anatomical region has been carried out, or from whom a medical image has been acquired in the same anatomical region.

The plurality of reference patients are filed in the medical information system. Filed means that each reference patient is associated with a patient identifier, which points to the patient information and/or medical images and/or other information concerning the reference patient.

In particular, the medical information system can be a database. In particular, the medical information system can be a picture archiving and communication system (acronym: PACS) and/or a laboratory information system (acronym: LIS) and/or a hospital information system (acronym: HIS) and/or a radiology information system (acronym: RIS), etc.

The plurality of relevant patients are in particular the patients for whom information is held in the medical information system.

In the method step of determining at least one similar patient, the search profile is applied by the computing unit in the medical information system. In this process are determined the reference patient(s) of the plurality of patients who satisfy the search profile. The reference patients determined in this way are patients similar to the patient. "Satisfy the search profile" means that a reference patient who satisfies the search profile has at least a certain proportion of attributes that are defined by the search profile. In particular, a reference patient determined in this way can satisfy, or have, all the attributes defined by the search profile.

In the method step of providing the information relating to the at least one similar patient, the information relating to the at least one similar patient is provided by the interface. In particular, the information relating to the at least one similar patient can be provided, in particular displayed, via a display unit.

In particular, patient information about the similar patient and/or a medical image of an examination region of the similar patient and/or a diagnostic task concerning the similar patient can comprise said information relating to the at least one similar patient.

The inventors have discovered that providing information relating to at least one similar patient can assist the radiologist in the evaluation of the medical image. For example, the radiologist can thereby be made aware of abnormalities in the medical image that have led to a specific diagnosis or to a medical finding in the similar patient. In addition, the information on the similar patient can be used to disclose to the radiologist what further treatments were carried out for the similar patient and, in embodiments of the present invention, how successful these treatments were.

According to a further aspect of an embodiment of the present invention, the information relating to the at least one similar patient comprises a diagnosis of the similar patient. In this case, the method step of providing information relating to the similar patient comprises a method step of providing the diagnosis of the similar patient.

In particular, the diagnosis describes a disorder that was diagnosed for the similar patient. In particular, the diagnosis for the similar patient can be based at least partially on a medical image that corresponds to the medical image of the patient. To correspond means that the medical images were captured using an identical imaging modality and/or depict the same examination region. For example, an imaging modality can be X-raying or computed tomography or magnetic resonance tomography or ultrasound, etc.

In the method step of providing the diagnosis, the diagnosis of the similar patient is provided via the interface. In particular here, the diagnosis can be displayed by a display unit.

The inventors have discovered that the evaluation of the medical image can be made faster and simpler if the radiologist is informed about what diagnosis was made for a similar patient. The radiologist is thereby provided with information about what, if applicable, he should pay particular attention to in the medical image in order to confirm or rule out an identical or similar diagnosis for the patient.

According to a further aspect of an embodiment of the present invention, the information relating to the similar patient comprises a medical image of the similar patient. In this case, the method also comprises a method step of applying the selected tool to the medical image of the similar patient. An edited medical image of the similar patient is determined in this process. The method also comprises a method step of providing the edited medical image of the similar patient.

The medical image of the similar patient depicts an examination region of the similar patient. At least part of the examination region depicted in the medical image of the similar patient is identical to the examination region of the patient depicted in the medical image. In particular, the medical image of the similar patient and the medical image of the patient depict the same anatomical region with respect to the similar patient and the patient respectively. The medical image of the similar patient is advantageously in the same image modality as the medical image of the patient. In other words, the two medical images advantageously show the same physical attributes of the depicted examination region. In other words, the medical image of the similar patient and the medical image of the patient are advantageously comparable.

In the method step of applying the selected tool to the medical image of the similar patient, the selected tool is applied by the computing unit. In this case, the selected tool is applied to the medical image of the similar patient in a similar way to how it is applied to the medical image of the patient. The medical image of the similar patient is thereby edited in a similar way to the medical image of the patient.

In the method step of providing the edited medical image of the similar patient, the edited medical image of the similar patient is provided by the interface. In particular, the edited medical image of the similar patient can be provided by a display unit, in particular a screen or monitor. In other words, the edited medical image of the similar patient can be displayed.

The edited medical image of the similar patient can be displayed jointly with the edited medical image of the patient.

The inventors have discovered that the evaluation of the medical image can be made faster and simpler if a further comparable medical image of a similar patient, which was edited in a similar way, is provided as a comparison. In particular, the radiologist can thereby be made aware of regions in the medical image of the similar patient that may also be relevant to the evaluation of the medical image of the patient.

One or more example embodiments of the present invention also relate to a system for providing an edited medical image. The system comprises an interface and a computing unit. The interface and/or the computing unit are designed to perform a method step of receiving a medical image. Said medical image depicts an examination region of a patient. The interface and/or the computing unit are designed to perform a method step of receiving patient information of the patient. The interface and/or computing unit are designed to determine an anatomical region on the basis of the medical image and the patient information. The examination region comprises said anatomical region. The interface and/or the computing unit are also designed to select a tool on the basis of the anatomical region. Said tool is designed to edit the medical image. The interface and/or the computing unit are also designed to apply the selected tool to the medical image. An edited medical image is determined in this process. The interface and/or the computing unit are also designed to provide the edited medical image.

Such a system can be designed in particular to perform the method described above for providing an edited medical image, and aspects of said method. The system is designed to perform this method and aspects thereof in that the interface and the computing unit are designed to perform the corresponding method steps.

One or more example embodiments of the present invention also relate to a system for providing an edited medical image, the system comprising: an interface and a computing unit or processor. The interface is configured to: receive a medical image depicting an examination region of a patient; receive patient information for the patient; and provide the edited medical image. The computing unit is configured to: determine an anatomical region based on the medical image and the patient information, the examination region including the anatomical region; select a tool based on the anatomical region, the tool being configured to edit the medical image; and apply the tool to the medical image to obtain the edited medical image.

One or more example embodiments of the present invention also relate to a computer program product comprising a computer program and to a computer-readable medium. An implementation largely in software has the advantage that even systems already in use can be easily upgraded by a software update in order to work in the described manner. Said computer program product may comprise in addition to the computer program, if applicable, extra elements such as e.g. documentation and/or extra components, and also hardware components such as e.g. hardware keys (dongles etc.) for using the software.

In particular, one or more example embodiments of the present invention also relate to a computer program product comprising a computer program, which can be loaded directly into a memory of a system, and which contains program segments in order to perform all the steps of the method described above for providing an edited medical image, and aspects of said method, when the program segments are executed by the system.

In particular, one or more example embodiments of the present invention relate to a computer-readable storage medium, on which are stored program segments which can be read and executed by a system in order to perform all the steps of the method described above for providing an edited medical image, and aspects of said method, when the program segments are executed by the system.

BRIEF DESCRIPTION OF THE DRAWINGS

The following figures and the descriptions thereof will clarify and elucidate the above-described properties, features and advantages of this invention. The figures and descriptions shall not restrict the present invention and its embodiments in any way.

Identical components are denoted by corresponding reference signs in the various figures, which are generally not shown to scale and in which.

DETAILED DESCRIPTION

Figure 1:
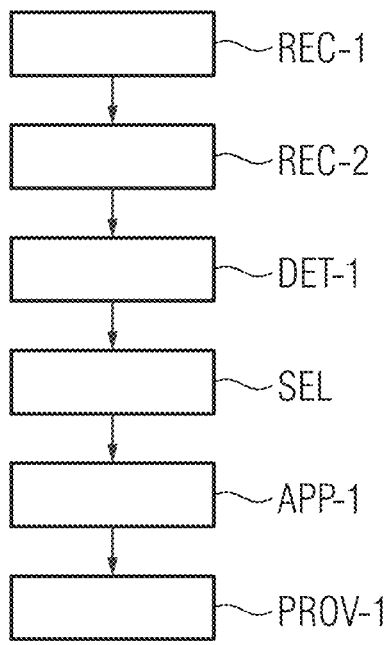
FIG. 1 shows a first exemplary embodiment of a method for providing an edited medical image.

FIG. 1 shows a first exemplary embodiment of a method for providing an edited medical image.

In a method step of receiving REC-1 a medical image, the medical image of a patient is received via an interface. Said medical image depicts an examination region of the patient. The examination region comprises at least a portion of the patient. For example, the examination region may be the patient's thorax, or the patient's skull, or the patient's abdomen, or a limb of the patient, etc. The medical image can be two-dimensional or three-dimensional. In particular, the medical image may be a two-dimensional X-ray image, an ultrasound image, a computed tomography (acronym: CT) image, a magnetic resonance tomography (acronym: MRT) image, a positron emission tomography (acronym: PET) image, or a single photon emission computed tomography (acronym: SPECT) image.

In a method step of receiving REC-2 patient information, the patient information about the patient is received via the interface. Said patient information comprises, for example, general information about the patient. For example, the patient information can comprise information about physical features of the patient such as the age and/or gender of the patient. Alternatively or additionally, the patient information can comprise information about a medical history of the patient. Said medical history can be described, for example, by medical findings, further medical images, diagnoses, etc. In particular, the patient information can comprise a patient file of the patient.

In a further method step of determining DET-1 an anatomical region, the anatomical region is determined on the basis of the patient information and the medical image via a computing unit. The examination region comprises said anatomical region. The anatomical region is thus depicted in the medical image.

The anatomical region is relevant in particular for evaluating the medical image. In the evaluation of the medical image, a user, in particular a radiologist, can make a diagnosis or a medical finding. The anatomical region can comprise an abnormality, for instance a lesion or a group of lesions or a tumor or a fissure or a calcification or a clot, etc. which is relevant for evaluating the medical image.

The anatomical region can comprise a body structure that comprises the abnormality, for example a lobe of the lungs, or the heart or a specific part of the brain of the patient. Alternatively, the anatomical region can comprise only the abnormality.

The determination DET-1 of the anatomical region can thus evaluate or take into account the patient information and the medical image.

In a further method step of selecting SEL a tool, a tool is selected on the basis of the anatomical region. The tool is selected from a set of available tools. The tool is designed to edit the medical image. The tool is specialized in analyzing the anatomical region in the medical image.

In a further method step of applying APP-1 the selected tool, the tool is applied to the medical image via the computing unit. An edited medical image is determined in this process.

For example, the anatomical region can be highlighted or marked, in particular segmented, in the edited medical image. If the medical image is three-dimensional, the edited medical image can comprise those slices of the three-dimensional medical image that depict the anatomical region or are relevant to an evaluation depending on the anatomical region. In embodiments of the invention, a distance measurement and/or dimension, for example, can be entered in the edited medical image. For example, a dimension, for instance a diameter, of a lesion can be entered or superimposed in the edited medical image. In other words, the edited medical image can be annotated by applying the tool.

In a method step of providing PROV-1 the edited medical image, the edited medical image is provided via the interface. The edited medical image can be provided to a display unit, in particular to a screen or a monitor. In this process, the edited medical image can be displayed. In particular, it is displayed to the user or the radiologist.

In embodiments of the present invention, the patient information comprises entries from a patient file of the patient, and/or at least one further medical image of the patient, which differs from the medical image, and/or a diagnostic task associated with the medical image.

The entries from the patient file can comprise in particular diagnoses and/or medical findings and/or general information about the patient, etc. In other words, the entries from the patient file can portray a medical history of the patient. In particular, the entries from the patient file can comprise information about examinations carried out on the patient.

In particular, the patient file can be an electronic patient file. The patient file can be held or stored in particular in a Hospital Information System (acronym: HIS). The patient file can be received from the HIS when the patient information is received.

The further medical image is different from the medical image The further medical image can have been captured at a different time than the medical image. The further medical image can depict at least a portion of the same examination region as the medical image. Alternatively, the further medical image can depict another examination region. The further medical image can have been captured using an imaging modality that is the same as, or differs from, the medical image. The imaging modality is defined by the device or system that has been used to capture the medical image or the further medical image. The imaging modality determines in particular which physical attributes of the examination region are depicted in the medical image or in the further medical image.

The diagnostic task specifies in particular for what purpose the medical image was meant to be captured. In particular, the diagnostic task can specify how the medical image should be captured, for instance using which imaging modality and/or which examination region and/or which anatomical region. The diagnostic task can specify what diagnosis is meant to be made or ruled out via the medical image.

Figure 2:
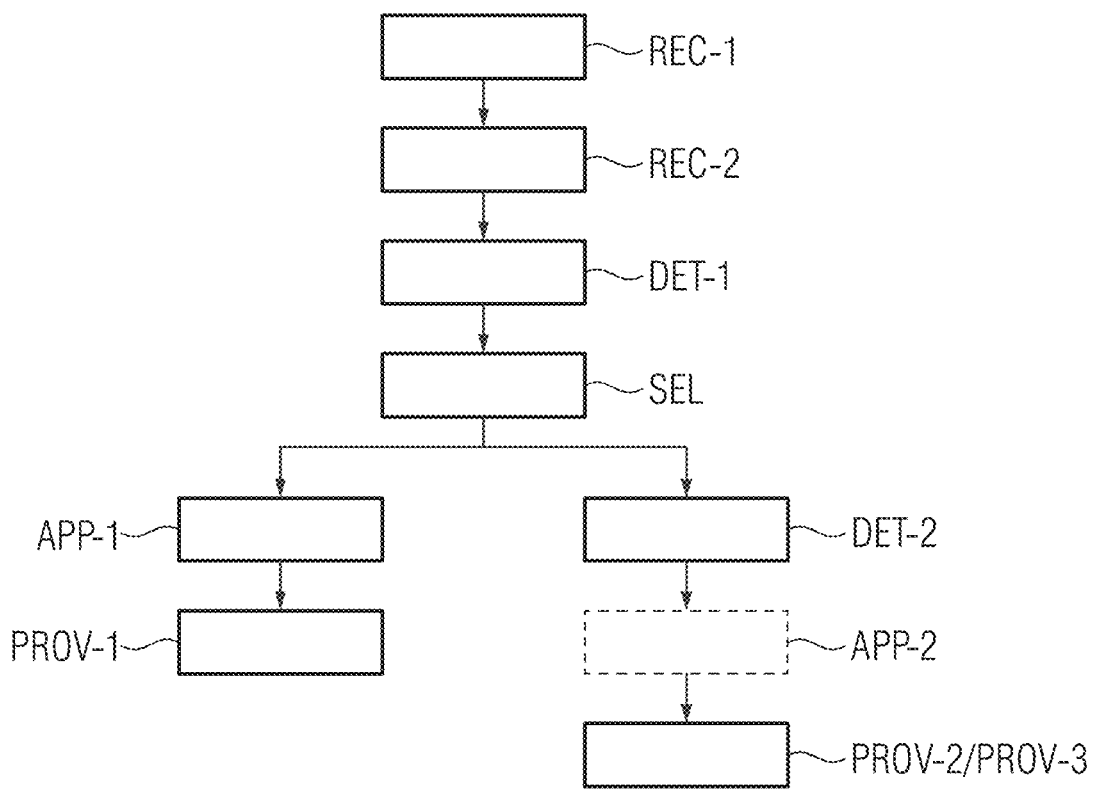
FIG. 2 shows a second exemplary embodiment of a method for providing an edited medical image.

FIG. 2 shows a second exemplary embodiment of a method for providing an edited medical image.

The method steps of receiving REC-1 a medical image, receiving REC-2 the patient information, determining DET-1 the anatomical region, selecting SEL the tool, applying APP-1 the selected tool to the medical image, and providing PROV-1 the edited medical image are embodied in accordance with the description relating to FIG. 1.

The method comprises a further method step of determining DET-2 from the patient information those further medical images of the patient that depict the anatomical region. The patient information comprises at least one further medical image of the patient.

In the method step of determining DET-2 those further medical images that depict the same anatomical region, those further medical images that depict the same anatomical region as the medical image are determined in the patient information by image analysis via the computing unit. It can be the case here that no further medical images, or one or more further medical images are determined.

In a method step of providing PROV-2 the determined further medical images, the further medical images determined in this manner from the patient information are provided via the interface. In particular, the determined further medical images are provided to a display unit, which is designed to display the further medical images. The further medical images can be displayed in parallel with the medical image. A change over time in the anatomical region can be presented in this way if the determined further medical images and the medical image present the anatomical region at different instants in time. Alternatively or additionally, the determined further medical images and the medical image can present different physical attributes of the anatomical region as a comparison, if the determined further medical images and the medical image have been captured using different imaging modalities.

According to an embodiment of the present invention, the method can comprise a method step of applying APP-2 the selected tool to the determined further medical images. In this process, the tool is applied to the determined further medical images in the same way as it is applied to the medical image. Edited further medical images are determined in this process. The edited further medical images are in a similar form to the edited medical image. In other words, similar markings and/or segmentations and/or dimensions and/or annotations are added in the edited further medical images as in the edited medical image.

According to the embodiment of the present invention, the edited further medical images are then provided in a further method step of providing PROV-3. In this step, the edited further medical images are provided via the interface in particular to the display unit for displaying the edited further medical images. The edited further medical images can be displayed jointly with the edited medical image. In this way, it is possible in particular to accentuate or highlight or present in a simplified manner a change over time in the anatomical region if the determined further medical images and the medical image were captured at different times. Alternatively or additionally, it is possible in this way to accentuate or highlight or present in a simplified manner different physical attributes of the anatomical region if the determined further medical images and the medical image have been captured using different imaging modalities.

Displaying a variation over time can make it simpler to analyze a development over time, for instance a disease. In other words, what is known as "trending" is possible more simply and in a clear manner.

Figure 3:
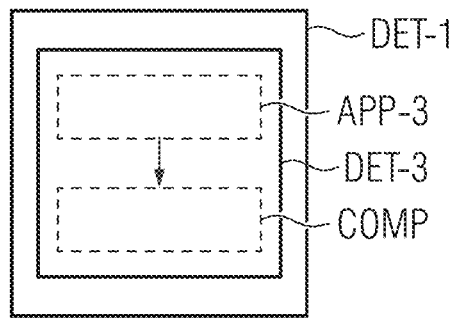
FIG. 3 shows a first exemplary embodiment of a method step of determining an anatomical region.

FIG. 3 shows a first exemplary embodiment of a method step of determining DET-1 an anatomical region.

The method step of determining DET-1 the anatomical region is basically embodied in accordance with the description relating to FIG. 1.

According to the first exemplary embodiment of the method step of determining DET-1 the anatomical region, the method step of determining DET-1 the anatomical region comprises a method step of determining DET-3 a set of observables. The set of observables is determined here on the basis of the patient information and the medical image. The determining DET-1 of the anatomical region is then based on the set of observables. In other words, the anatomical region is determined according to the set of observables.

The set of observables comprises at least one observable. The set of observables comprises attributes which can be extracted from the patient information and from the medical image. In particular, the set of observables can comprise a collection of the most important attributes from the patient information and from the medical image.

In embodiments of the present invention, an observable from the set of observables can be a system-internal observable, or an entry in a set of attributes that is associated with the medical image, or a body part according to a medical finding according to the patient information, or an abnormal laboratory value according to the patient information, or a body region from which, according to the patient information, a tissue sample was taken, or a suspected diagnosis or medical finding according to the patient information, or a keyword from a diagnostic task for the medical image.

A system-internal observable can be based on a predetermined, in particular standardized, anatomical ontology. In addition, one or more system-internal observables can be linked together hierarchically in accordance with the predetermined anatomical ontology. The predetermined anatomical ontology can be based on the "SNOMED Clinical Terms" terminology or ontology and/or the "RadLex" terminology or ontology. The use of these standardized terminologies, which are known per se, for defining or structuring the observables ensures compatibility with the clinical procedures, improves the exchange of information, and simplifies the assignment of the anatomical region.

The set of attributes can be in particular a DICOM header of the medical image. The DICOM header can comprise a plurality of entries or a set of entries. Each entry can be defined by a DICOM tag and a DICOM value. The DICOM tag defines the attribute, which is particularized or designated by the DICOM value. For example, a DICOM entry can comprise a DICOM tag "body region" and a DICOM value "thorax". This specifies that the "thorax" body region is depicted in the medical image. An entry relevant to the evaluation of the medical image can form an observable in the set of observables. In particular, the DICOM value of the entry can form the observable.

The observable can be a keyword that describes the above-mentioned attributes or details. The keyword can be specified in the form of a system-internal observable. In other words, for example, the body part or the medical finding or the diagnosis can be specified in the form of a system-internal observable. For a diagnosis or a medical finding, the system-internal observable can be specified as an ICD 10 code According to an embodiment of the present invention, sets of typical observables can be defined for a plurality of anatomical regions. In this case, a set of typical observables is defined for each anatomical region of the plurality of anatomical regions. In the determining DET-1 of the anatomical region, the sets of typical observables can be compared with the determined set of observables. Pattern recognition is used here to determine the set of typical observables that best matches, or has the greatest match with, the determined set of observables. The anatomical region associated with this set of typical observables is then the determined anatomical region.

In an embodiment of the present invention, the method step of determining DET-3 the set of observables comprises a method step of applying APP-3 a linguistic analysis function to at least one entry from the patient file and/or to a diagnostic task. The patient information here comprises the at least one entry from the patient file and/or comprises the diagnostic task. At least one keyword is determined in this process. The method step of determining DET-3 the set of observables then also comprises a method step of comparing COMP the at least one keyword with the set of attributes. In the event of a positive comparison, the keyword is adopted in the set of observables as an observable.

The linguistic analysis function is designed to analyze linguistically the diagnostic task and/or the entry from the patient file. The keyword can then be a summary or the most important attribute or information from the entry in the patient file and/or from the diagnostic task. The keyword can be in the form of a word or in the form of an ontology described above.

The comparing COM of the keyword with the set of attributes compares whether the set of attributes comprises the keyword itself or a synonym of the keyword. The set of attributes can be a DICOM header as described above. The comparison can be based in particular on the DICOM values. In the event of a positive comparison, the set of attributes comprises the keyword or a synonym of the keyword. Then the keyword or the synonym of the keyword or a generalized form of the keyword is adopted in the set of observables. In other words, the keyword or the synonym of the keyword or the generalization of the keyword then forms an observable in the set of attributes. The generalization of the keyword can comprise in particular a conversion of the keyword into a system-internal observable.

Figure 4:
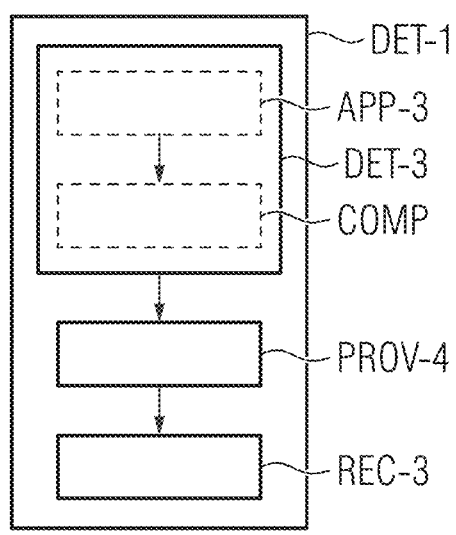
FIG. 4 shows a second exemplary embodiment of a method step of determining an anatomical region.

FIG. 4 shows a second exemplary embodiment of a method step of determining an anatomical region.

The method step of determining DET-1 the anatomical region is basically embodied as in the descriptions relating to FIGS. 1 and 3. The method step of determining DET-3 the set of observables is embodied in accordance with the description relating to FIG. 3.

The method step of determining DET-1 the anatomical region comprises, according to the exemplary embodiment described below, a method step of providing PROV-4 the set of observables and a method step of receiving REC-3 a user input relating to the set of observables. The determining DET-1 of the anatomical region takes into account said user input.

In the method step of providing PROV-4 the set of observables, the set of observables is provided in particular via the interface. The set of observables can be provided in particular to the display unit for displaying the observables. The set of observables is provided to the user, in particular to the radiologist.

The user input is received via the interface in the method step of receiving REC-3 the user input. The user input is provided by the user, in particular by the radiologist. The user can provide the user input via an input unit, for example a touchscreen and/or a touchpad and/or a mouse click, etc. The user input here relates to the set of observables. The user input can be designed here to confirm or modify the set of observables. The anatomical region is then determined on the basis of the confirmed or the modified set of observables.

In an alternative embodiment of the present invention, the anatomical region can be determined first on the basis of the determined set of observables as described above. Then, in the method step of providing PROV-4 the set of observables, the determined anatomical region can additionally be provided. The user input can then additionally take into account the already determined anatomical region and confirm or modify the set of observables accordingly. The anatomical region can then be redetermined on the basis of the confirmed or modified set of observables.

In embodiments of the present invention, the user input relating to the set of observables comprises prioritizing and/or deleting and/or selecting the observables.

In the case of prioritizing, the observables of the set of observables are prioritized by the user input. The prioritizing can be used to specify to what degree each observable shall be taken into account in determining DET-1 the anatomical region. If the anatomical region is determined, for example, as described by the description relating to FIG. 3, the prioritization can be used to define those observables for which special account shall be taken in the comparison of the set of observables with the sets of typical observables.

In the case of deleting, one or more observables can be deleted from the set of observables by the user input.

In the case of selecting, one or more observables can be selected from the set of observables. In this case, the set of observables can be modified such that it then just comprises the selected observables, and all the other observables are deleted or removed from the set of observables. Alternatively or additionally, the selecting of an observable can add an observable to the set of observables. In other words, an observable which the set of observables does not yet comprise can be added in this way to the set of observables.

Figure 5:
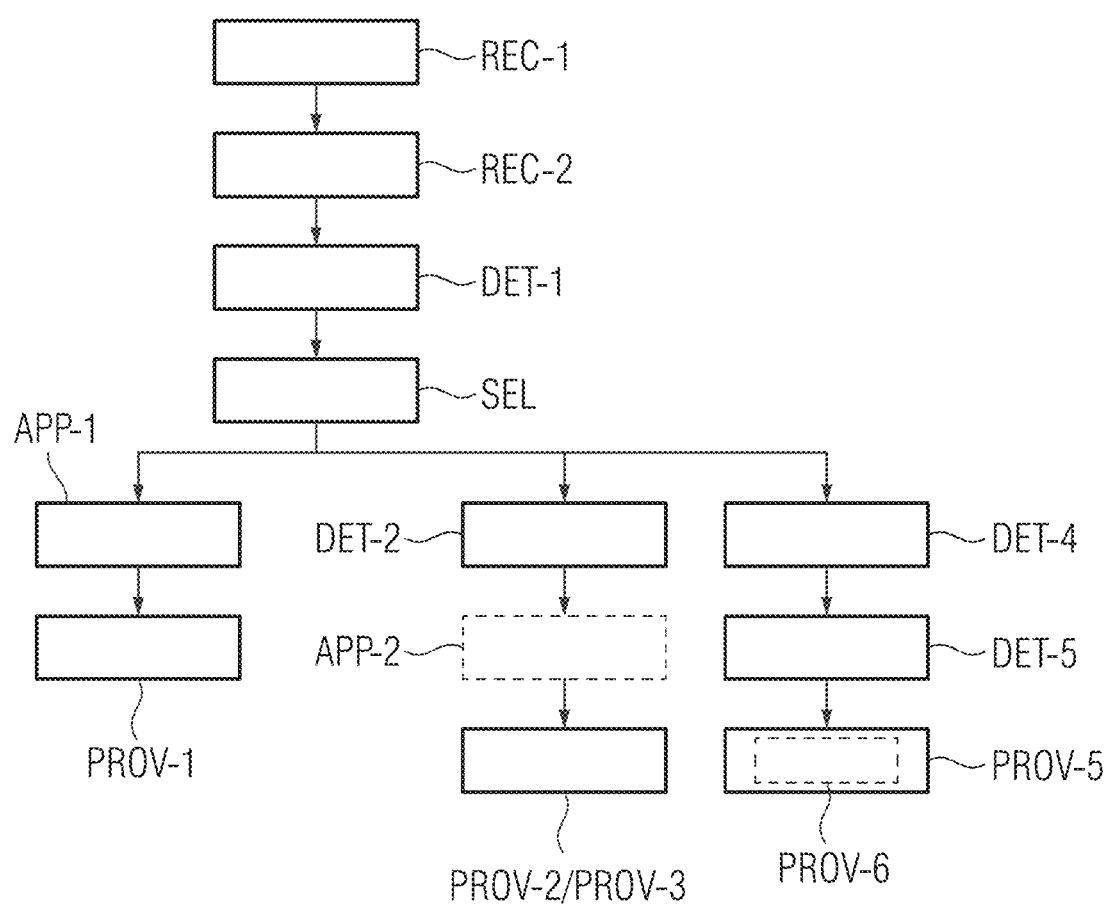
FIG. 5 shows a third exemplary embodiment of a method for providing an edited medical image.

FIG. 5 shows a third exemplary embodiment of a method for providing an edited medical image.

The method steps already described in the descriptions relating to FIG. 1 or 2 are embodied in accordance with the description. The method step of determining DET-1 the anatomical region can be embodied here according to one of the exemplary embodiments from FIG. 3 or 4.

Alternatively, the additional method steps described below can also be embodied with the first exemplary embodiment according to FIG. 1.

In a further method step of determining DET-4 a search profile, a search profile for similar patients is determined on the basis of the patient information and/or the medical image via the computing unit. In other words, a search profile is determined that can be used to search for one or more patients similar to the patient.

A similar patient can have similar attributes and/or diagnoses and/or medical findings and/or examinations as the patient.

The search profile defines the attributes and/or diagnoses and/or medical findings and/or examinations, etc. that the similar patient should have.

In embodiments of the present invention, a set of observables can be determined for this purpose as described in the figures above. Then the search profile for the similar patient can be created based on this set of observables.

Alternatively, the search profile can be determined by applying a trained function to the patient information and to the medical image. The trained function can have been trained in this case via federated learning.

In an alternative embodiment, the search profile can be determined alternatively or additionally on the basis of the determined anatomical region. In other words, the search profile takes into account the determined anatomical region. In particular, the search profile can then be used to search for one or more similar patients for whom likewise at least one examination of the same anatomical region has been carried out and/or a medical image of the same anatomical region has been captured.

In a further method step of determining DET-5 at least one similar patient, at least one similar patient from a plurality of reference patients is determined via the computing unit. The at least one similar patient is determined here by applying the search profile in a medical information system in which the reference patients are filed.

In particular, the medical information system can be a PAC or an LIS or an HIS or an RIS. In other words, the medical information system is a database.

"Filed" means that information relating to the reference patients is held or stored in the medical information system. Each reference patient is associated with a patient identifier, which facilitates access to the information relating to the reference patient.

By applying the search profile, those reference patients are determined who satisfy the requirements of the search profile. In particular, those reference patients are thereby determined who satisfy the attributes and/or diagnoses and/ or medical findings and/or examinations defined in the search profile. It can be the case here that no reference patients, or one or more reference patients are determined. These reference patients are denoted as similar patients to the patient.

In a further method step of providing PROV-5 information relating to the at least one similar patient, the information about the similar patient is provided via the interface. The information relating to the similar patient is in particular patient information or a medical image of the similar patient. The patient information and the similar image are embodied as described in the description relating to FIG. 1 regarding the patient. The information relating to the similar patient can be provided in particular to the display unit for display.

According to an embodiment of the present invention, the information relating to the similar patient comprises a diagnosis of the similar patient. The method step of providing PROV-5 the information relating to the similar patient can then comprise a method step of providing PROV-6 the diagnosis of the similar patient. It is thereby possible to provide information about what diagnosis was made for a similar patient in a possibly similar situation. This information can be provided, in particular displayed, jointly with the edited medical image.

Figure 6:
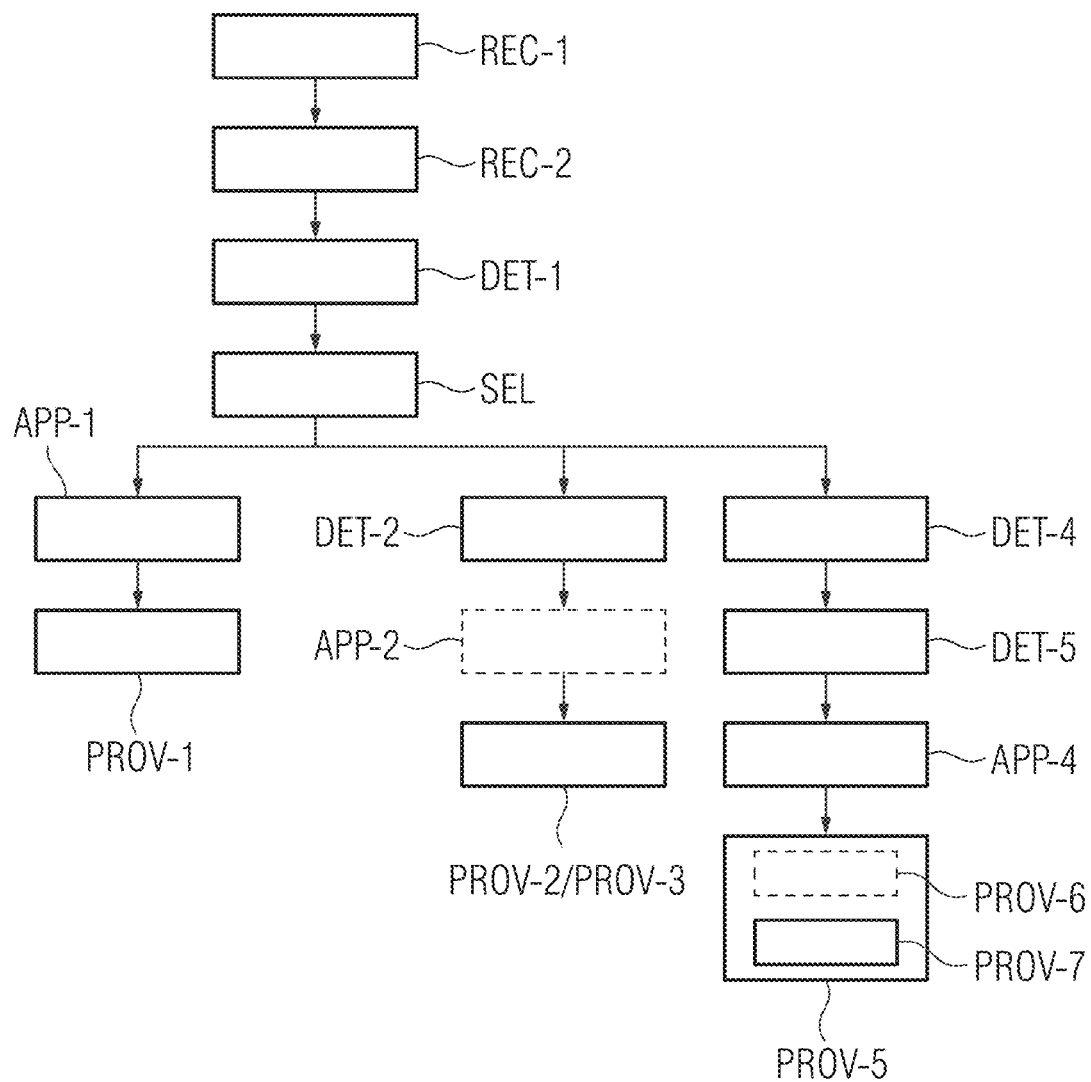
FIG. 6 shows a fourth exemplary embodiment of a method for providing an edited medical image.

FIG. 6 shows a fourth exemplary embodiment of a method for providing an edited medical image.

The method steps already described in the descriptions relating to FIG. 1, 2 or 5 are embodied in accordance with the description. The method step of determining DET-1 the anatomical region can be embodied here according to one of the exemplary embodiments from FIG. 3 or 4.

Alternatively, the additional method steps described below can also be embodied with the first exemplary embodiment according to FIG. 1.

The information relating to the similar patient comprises at least one medical image of the similar patient. It is advantageous here that the diagnostic task relating to the at least one medical image of the similar patient is identical or similar to the diagnostic task of the medical image. In particular, the at least one medical image of the similar patient advantageously depicts the determined anatomical region of the similar patient.

In a method step of applying APP-4 the selected tool to the medical image of the similar patient, the tool is applied to the medical image of the similar patient via the computing unit. An edited medical image of the similar patient is determined in this process. The edited medical image of the similar patient is edited here in a similar way to the edited medical image of the patient. In other words, both images comprise the same markings and/or annotations and/or dimensions, etc.

In a method step of providing PROV-7 the edited medical image of the similar patient, the medical image of the similar patient that is edited in this way is provided via the interface. In particular, the edited medical image of the similar patient is displayed by the display unit. The edited medical image of the similar patient is advantageously displayed jointly with the edited medical image of the patient.

Figure 7:
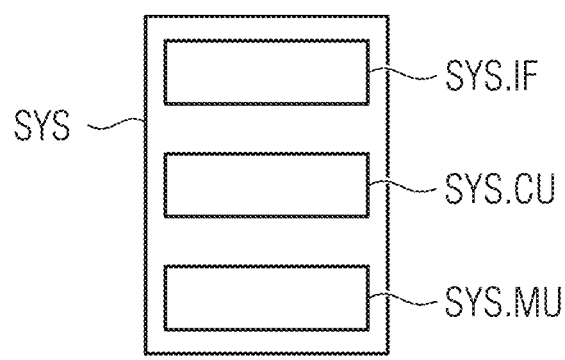
FIG. 7 shows a system for providing an edited medical image.

FIG. 7 shows a system SYS for providing an edited medical image.

The presented system SYS for providing an edited medical image is designed to perform a method, according to an embodiment of the present invention, for providing an edited medical image. The system SYS comprises an interface SYS.IF, a computing unit SYS.CU, and a memory unit SYS.MU.

The system SYS may be in particular a computer, a microcontroller or an integrated circuit (IC). Alternatively, the system SYS may be a real or virtual computer network (a technical term for a real computer network is a "cluster", and a technical term for a virtual computer network is a "Cloud"). The system SYS can be embodied as a virtual system, which is implemented on a computer or a real computer network or a virtual computer network (a technical term is "virtualization").

The interface SYS. IF can be a hardware or software interface (for instance a PCI bus, USB, or Firewire). The computing unit SYS.CU can comprise hardware and/or software elements, for instance a microprocessor or what is known as an FPGA (field programmable gate array). The memory unit SYS. MU can be embodied as a non-permanent main memory (random access memory, RAM for short) or as a permanent mass storage device (hard disk, USB stick, SD card, solid state disk (SSD)).

In particular, the interface SYS. IF can comprise a plurality of sub-interfaces, which perform different method steps of the particular method according to an embodiment of the present invention. In other words, the interface SYS. IF can be embodied as a plurality of interfaces SYS. IF. In particular, the computing unit SYS. CU can comprise a plurality of sub-computing units, which perform different method steps of the particular method according to an embodiment of the present invention. In other words, the computing unit SYS. CU can be embodied as a plurality of computing units SYS.CU.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Even if not explicitly stated, individual exemplary embodiments, or individual sub-aspects or features of these exemplary embodiments, can be combined with, or substituted for, one another, if this is practical and within the meaning of the present invention, without departing from the present invention. Without being stated explicitly, advantages of the present invention that are described with reference to one exemplary embodiment also apply to other exemplary embodiments, where transferable.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method for providing an edited medical image, the computer-implemented method comprising:
    receiving a medical image depicting an examination region of a patient, the medical image being associated with a set of attributes;
    receiving patient information for the patient, the patient information including at least one of an entry from a patient file or a diagnostic task;
    determining an anatomical region based on a set of observables, the examination region including the anatomical region, the determining including determining the set of observables, and the determining the set of observables including
        determining at least one keyword by applying a linguistic analysis function to the at least one of the entry from the patient file or the diagnostic task, and
        comparing the at least one keyword with the set of attributes;
    selecting a tool based on the anatomical region, the tool being configured to edit the medical image;
    applying the tool to the medical image to obtain the edited medical image; and
    providing the edited medical image.

2. The computer-implemented method as claimed in claim 1, wherein the patient information includes at least one of:
    entries from the patient file of the patient;
    at least one further medical image of the patient, the at least one further medical image being different from the medical image; or
    the diagnostic task, the diagnostic task being associated with the medical image.

3. The computer-implemented method as claimed in claim 2, further comprising:
    determining further medical images of the patient depicting the anatomical region based on the patient information; and
    providing the further medical images.

4. The computer-implemented method as claimed in claim 3, further comprising:
applying the tool to the further medical images to obtain edited further medical images; and
providing the edited further medical images.

5. The computer-implemented method as claimed in claim 4, wherein the determining the anatomical region comprises:
determining the anatomical region from among a plurality of anatomical regions using pattern recognition, each of the plurality of anatomical regions being associated with a corresponding set of typical observables, and the pattern recognition being used to determine, the anatomical region from among the plurality of anatomical regions as that for which the corresponding set of typical observables best matches the set of observables.

6. The computer-implemented method as claimed in claim 1, wherein an observable from among the set of observables is one of:
a system-internal observable;
an entry in the set of attributes;
a body part associated with a medical finding according to the patient information;
an abnormal laboratory value according to the patient information;
a body region from which; a tissue sample was taken according to the patient information;
a suspected diagnosis or medical finding according to the patient information; or
a keyword from the diagnostic task, the diagnostic task being associated with the medical image.

7. The computer-implemented method as claimed in claim 6, wherein the determining the anatomical region comprises:
determining the anatomical region from among a plurality of anatomical regions using pattern recognition, each of the plurality of anatomical regions being associated with a corresponding set of typical observables, and the pattern recognition being used to determine, the anatomical region from among the plurality of anatomical regions as that for which the corresponding set of typical observables best matches the set of observables.

8. The computer-implemented method as claimed in claim 1, wherein the determining the anatomical region comprises:
determining the anatomical region from among a plurality of anatomical regions using pattern recognition, each of the plurality of anatomical regions being associated with a corresponding set of typical observables, and the pattern recognition being used to determine the anatomical region from among the plurality of anatomical regions as that for which the corresponding set of typical observables best matches the set of observables.

9. The computer-implemented method as claimed in claim 1, further comprising:
providing the set of observables; and
receiving a user input relating to the set of observables, the determining the anatomical region being performed based on the user input.

10. The computer-implemented method as claimed in claim 9, wherein the user input relating to the set of observables includes at least one of prioritizing, deleting or selecting one or more observables among the set of observables.

11. The computer-implemented method as claimed in claim 1, further comprising:
determining a search profile for similar patients based on at least one of the patient information or the medical image;
determining at least one similar patient, from among a plurality of reference patients, by applying the search profile; and
providing information relating to the at least one similar patient.

12. The computer-implemented method as claimed in claim 11, wherein
the information relating to the at least one similar patient includes a diagnosis of the at least one similar patient; and
the providing the information relating to the at least one similar patient includes providing the diagnosis of the at least one similar patient.

13. The computer-implemented method as claimed in claim 11, wherein
the information relating to the at least one similar patient includes a medical image of the at least one similar patient; and
the computer-implemented method further includes
applying the tool to the medical image of the at least one similar patient to obtain an edited medical image of the at least one similar patient, and
providing the edited medical image of the at least one similar patient.

14. A system for providing an edited medical image, the system comprising:
an interface configured to
receive a medical image depicting an examination region of a patient, the medical image being associated with a set of attributes,
receive patient information for the patient, the patient information including at least one of an entry from a patient file or a diagnostic task, and
provide the edited medical image; and
a computing unit configured to
determine an anatomical region based on a set of observables, the examination region including the anatomical region, the determination of the anatomical region including determining the set of observables, and the determining the set of observables including
determining at least one keyword by applying a linguistic analysis function to the at least one of the entry from the patient file or the diagnostic task, and
comparing the at least one keyword with the set of attributes,
select a tool based on the anatomical region, the tool being configured to edit the medical image, and
apply the tool to the medical image to obtain the edited medical image.

15. A non-transitory computer program product including a computer program, which can be loaded into a memory of a system, and which contains program segments that, when executed by the system, cause the system to perform the computer-implemented method of claim 1.

16. A non-transitory computer-readable storage medium storing program segments that, when executed by a system, cause the system to perform the computer-implemented method of claim 1.

17. A computer-implemented method for providing an edited medical image, the computer-implemented method comprising:
receiving a medical image depicting an examination region of a patient;
receiving patient information for the patient;

determining an anatomical region based on a set of observables, the examination region including the anatomical region, and the determining including
    determining the set of observables based on the medical image and the patient information, and
    determining the anatomical region from among a plurality of anatomical regions using pattern recognition, each of the plurality of anatomical regions being associated with a corresponding set of typical observables, and the pattern recognition being used to determine the anatomical region from among the plurality of anatomical regions as that for which the corresponding set of typical observables best matches the set of observables;
selecting a tool based on the anatomical region, the tool being configured to edit the medical image;
applying the tool to the medical image to obtain the edited medical image; and
providing the edited medical image.

18. The computer-implemented method as claimed in claim 17, wherein the patient information includes at least one of:
    entries from a patient file of the patient;
    at least one further medical image of the patient, the at least one further medical image being different from the medical image; or
    a diagnostic task associated with the medical image.

19. A system for providing an edited medical image, the system comprising:
    an interface configured to
        receive a medical image depicting an examination region of a patient,
        receive patient information for the patient, and
        provide the edited medical image; and
    a computing unit configured to
        determine an anatomical region based on a set of observables, the examination region including the anatomical region, and the determination of the anatomical region including
            determining the set of observables based on the medical image and the patient information, and
            determining the anatomical region from among a plurality of anatomical regions using pattern recognition, each of the plurality of anatomical regions being associated with a corresponding set of typical observables, and the pattern recognition being used to determine the anatomical region from among the plurality of anatomical regions as that for which the corresponding set of typical observables best matches the set of observables,
        select a tool based on the anatomical region, the tool being configured to edit the medical image, and
        apply the tool to the medical image to obtain the edited medical image.

20. The system as claimed in claim 19, wherein the patient information includes at least one of:
    entries from a patient file of the patient;
    at least one further medical image of the patient, the at least one further medical image being different from the medical image; or
    a diagnostic task associated with the medical image.

* * * * *